United States Patent [19]

Hiyama et al.

[11] Patent Number: 5,222,847
[45] Date of Patent: Jun. 29, 1993

[54] TAP

[75] Inventors: Nobuo Hiyama; Yoshiharu Kato, both of Utsunomiya, Japan

[73] Assignee: Izumo Industrial Co., Lts., Japan

[21] Appl. No.: 751,750

[22] Filed: Aug. 29, 1991

[30] Foreign Application Priority Data

Aug. 30, 1990 [JP] Japan .................. 2-228981

[51] Int. Cl.[5] .......................................... B23G 5/06
[52] U.S. Cl. .................................. 408/222; 408/215; 470/198
[58] Field of Search ............... 408/215, 217, 218, 222, 408/230; 470/198

[56] References Cited

U.S. PATENT DOCUMENTS 4,963,059 10/1990 Hiyama .

FOREIGN PATENT DOCUMENTS 2331927 1/1975 Fed. Rep. of Germany .
2504722 8/1976 Fed. Rep. of Germany .
3706282 9/1987 Fed. Rep. of Germany .
114808 5/1988 Japan ................... 408/230

OTHER PUBLICATIONS

European Search Report, Appln. No. EP 91 40 2338.

Primary Examiner—Daniel W. Howell
Attorney, Agent, or Firm—Thompson, Hine and Flory

[57] ABSTRACT

A tap having a main body having a crest, a heel, and an outer circumference is disclosed. The tap main body has a male screw part at the crest side. At this male screw part, a plurality of grooves opening to the crest and the outer circumference of tap main body is formed. A tap main body has a cutting edge at each ridge part defined by a wall of said plurality of grooves and an outer circumference of a male screw part. These cutting edges each have a crest part and a heel part. The crest part of at least one cutting edge has an axial rake angle which differs from an axial rake angle of the crest part of another cutting edge.

20 Claims, 4 Drawing Sheets

TAP

BACKGROUND OF THE INVENTION

1. Field of the Invention

The present invention relates to a tap which is used when a female screw is manufactured in a workpiece.

2. Prior Art

Heretofore, among taps used for manufacturing female screws in workpieces, for example, those shown in FIGS. 7 and 8, there are known taps designed for, in particular, decreasing the cutting resistance and for improving chip discharge quality. The taps shown in these figures are formed by a male screw part 2 on the crest side of the tap main body 1 forming a shaft, and are formed by a plurality of grooves 3 spiraling around the axis of tap main body 1 in this male screw part 2, and are further formed by a cutting edge 4 on the ridge part of the wall of these grooves 3 and on the outer circumference of male screw part 2; due to the spiraling cutting edge along the entire length, this type of tap is called a "spiral tap". As indicated in FIG. 9, in the spiral tap 5 in the illustration, all the circumferential pitches P on the crest of cutting edge 4 are set to be equal. In addition, the helical angles $\theta$ of cutting edges 4 are all set to be equal.

In the spiral tap 5, as the angle which the cutting face of a land makes with the longitudinal axis of the tap $(=\theta)$ of cutting edge 4 increases in the positive angle direction, the cutting resistance decreases, and since the chips discharged in grooves 3 are forced out toward the heel side of tap main body 1 by the walls of grooves 3, the efficiency of chip discharge improves.

Moreover, there are other known taps having improved chip discharge efficiency (in addition to the spiral tap 5) for example, those shown in FIGS. 10 and 11. The taps shown in these figures have in common certain features shown in FIGS. 7 and 8 in that a plurality of groove parts 6 is formed by male screw parts 2 of tap main body 1 and in that cutting edge 7 is formed by the ridge part of these groove parts 6 and on the outer circumference of male screw part 2; and they differ from tap 5 of FIGS. 7 and 8 in that the crest side walls of groove parts 6 are formed by a twisting surface spiraling in the direction opposite to that of the spiral tap 5, towards the axis of tap main body 1; spiral part 8 is formed by the crest side of cutting edge 7, and chips produced by said spiral part 8 are discharged to the crest side of the tap; this type of tap is called a "gun tap".

As indicated in FIG. 12, the circumferential pitches P of the tap crest of the cutting edge 7 are set to be mutually equal in gun tap 9. Furthermore, the angles which the cutting face of a land makes with the longitudinal axis of the tap $\theta$ of spiral part 8 are also set to be equal. In gun tap 9, instead of the spiral part 8, a straight notch crossing the axis of tap main body 1 at a skewed angle is cut in the crest side of groove parts 6, and therefore an inclined part at the crest side of cutting edge 7 is provided, and the angles which the cutting face of a land makes with the longitudinal axis of the tap of the crest parts of cutting edge 7 are all set to be equal.

In the above-mentioned taps 5 and 9 of the prior art, the thread formed in the workpiece by cutting edges 4 and 7, and the above male screw part 2 of taps 5 and 9, make contact and advance during processing; however, at times the cutting resistance load on cutting edges 4 and 7 changes and produces an irregular radial deflection in male screw part 2. Since the thread formed by cutting edges 4 and 7 and male screw part 2 do not come into perfect contact when such a deflection occurs, the shape of the resulting thread differs from the intended shape, production accuracy deteriorates, and the thread is defective.

Recently, due to greater control of the rotation frequency and feed rate of the tap main body 1 for which numerically controlled machine tools are used, automation and increased speed of female screw production is widely practiced. The production of female screws by such mechanical means is much faster when compared to the cutting speed attained when female screws are manufactured by manual means. Consequently, the vibration of the tap due to irregular changes of the cutting load put on cutting edges 4 and 7 easily exceeds manageable limits, manufacturing accuracy deteriorates extremely, and it is possible that damage to the tap will result.

SUMMARY OF THE INVENTION

It is an object of the present invention to prevent deterioration of manufacturing accuracy due to radial irregular deflections of the tap main body, and moreover, to provide a tap which can control the potential increased vibration during the manufacturing process.

In order to attain the above-mentioned object, the tap of the present invention provides a tap in which the tap main body has a crest, a heel, and an outer circumference; the tap main body has a male screw part on the side of the crest; a plurality of groove parts opening to the crest and to the outer circumference of the tap main body formed on the male screw part; the tap main body having cutting edges on each of the ridge parts bordered by a wall of the plurality of groove parts and the outer circumference of the male screw part; each cutting edge having a crest part and a heel part; the crest part of at least one of the cutting edges of the cutting edges has an axial rake angle having a value differing from the value of the axial rake angle of the crest part of another cutting edge.

In the tap of the above configuration, since the component in the radial direction of the cutting load of the tap main body changes in correspondence with the change in the angle which the cutting face of a land makes with the longitudinal axis of the tap, the balance of the cutting load acting on the cutting edge of the tap main body is disrupted, a part in the circumference of the male screw part is constantly pressed harder on the inner wall of the workpiece compared to other parts of the male screw during processing. Accordingly, if the engagement of the tap main body with the thread of the workpiece is freed of irregular deflections, the engagement becomes more uniform. Moreover, as a certain part of the tap main body is firmly pressed against the thread of the workpiece, the burnishing effect due to the abrasion of the male screw part on the inner wall of the workpiece becomes large. Accordingly, the surface roughness of the thread of the workpiece is improved and the manufacturing accuracy is advanced in comparison to the prior art.

Since the angle which the cutting face of a land makes with the longitudinal axis of the tap of the cutting edge changes, the circumferential pitches of the plurality of corresponding cutting edges also change. Therefore, when the tap main body is rotated at a set speed, the distance at which each cutting edge cuts into the workpiece changes irregularly and the cutting load transmitted by each cutting edge to the tap main body also varies irregularly. Accordingly, the generation of a periodic vibration of the tap main body is disrupted, the vibration transmitted from each cutting edge is preferably countered, and an increment of vibration is suppressed. In this way, manufacturing accuracy is still further improved and such problems as damage to the tap are avoided.

DETAILED DESCRIPTION OF THE PREFERRED EMBODIMENTS

The first embodiment of the present invention will be explained with reference to FIGS. 1 to 3.

Figure 1:
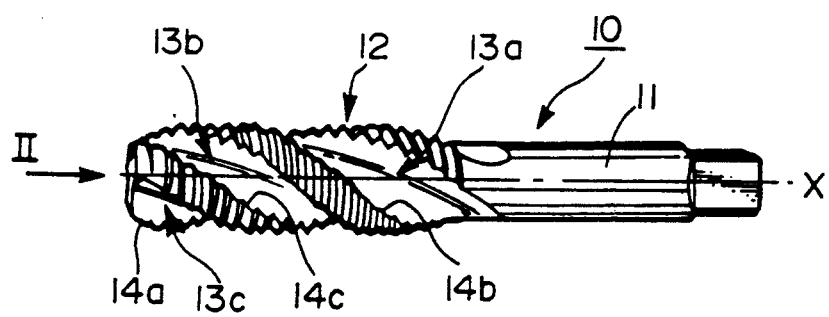
FIG. 1 shows a side view of a tap in the first embodiment of the present invention.
Figure 2:
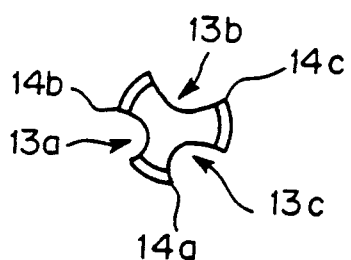
FIG. 2 shows the form of the tap in FIG. 1 when viewed in the direction of arrow II.

The corresponding part 10 in FIGS. 1 and 2 is a tap of the preferred embodiment. This tap 10 has a tap main body 11 forming a shaft, and male screw part 12 is formed on the distal of tap main body 11. On male screw part 12, a plurality (three in this figure) of groove parts 13a to 13c is formed in such a way that the groove parts spiral around the axis X of tap main body 11. Groove parts 13a to 13c open to the crest and the outer circumference of the tap main body 11, and cutting edges 14a to 14c are formed on the ridge part consisting of the wall of groove parts 13a to 13c and the outer circumference of male screw part 12. Furthermore, cutting edges 14a to 14c follow the outer circumference of tap main body 11, and are formed at the interface of the spiral flutes 13a–13c and the crest end of the lands as spiral cutting edges.

Figure 3:
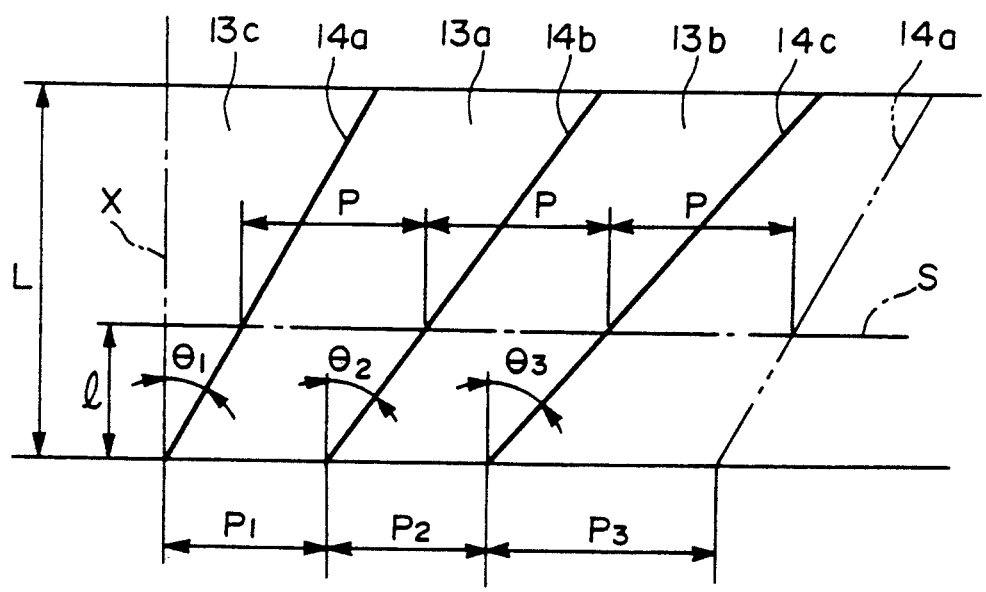
FIG. 3 shows an outer radial development of the male screw part of the tap in FIG. 1.

As shown in detail in FIG. 3, the angles which the cutting face of a land makes with the longitudinal axis of a tap $\theta_1$ to $\theta_3$ of each cutting edge 14a to 14c are all set to different values. Furthermore, the relative values of the angles which the cutting face of a land makes with the longitudinal axis of a tap $\theta_1$ to $\theta_3$ are $\theta_1<\theta_2<\theta_3$.

The difference in the angles which the cutting face of a land makes with the longitudinal axis of the tap $\theta_1$ to $\theta_3$ of each cutting edge 14a to 14c is suitably set in correspondence with the screw diameter of the female screw formed in the workpiece and the cutting speed during manufacturing. However, if possible, the difference of the maximum value $\theta_3$ and minimum value of $\theta_1$ of the angles which the cutting face of a land makes with the longitudinal axis of the tap $(\theta_3-\theta_1)$ should most preferably be determined so that it lies in the range of 1° to 15°. In the case where the difference in angles which the cutting face of a land makes with the longitudinal axis of the tap $(\theta_3-\theta_1)$ is less than 1°, there is some risk that the positive improvement in manufacturing speed and suppression of vibration obtained by changing the angles which the cutting face of a land makes with the longitudinal axis of the tap $\theta_1$ to $\theta_3$ is not sufficient. Moreover, when the difference of angles which the cutting face of a land makes with the longitudinal axis of the tap $(\theta_3-\theta_1)$ does exceed 15°, considerable difference occurs in the radial components of the cutting load of tap main body 11, and when cutting edges 14a to 14c cut into a workpiece, there is a risk that male screw part 12 will vibrate considerably, and manufacturing accuracy would therefore deteriorate.

As shown in FIG. 3, cutting edges 14a to 14c are at equal distance intervals P in the circumferential direction of tap main body 11 in a plane S orthogonal to the axis X of tap main body 11. Plane S may be at any position along the entire length L of cutting edges 14a to 14c; however, plane S" is arranged such that its position only lies at a fixed distance $1=L/3$ to $2L/3$ from the crest to the heel of the tap main body 11. By positioning plane S between either end of cutting edges 14a to 14c, and by making angles which the cutting face of a land makes with the longitudinal axis of the tap $\theta_1$ to $\theta_3$ of cutting edges 14a to 14c different from each other, the values of the circumferential pitches of $P_1$ to $P_3$ of tap main body 11 in the crest of cutting edges 14a to 14c become different from one another. Then, the magnitude of the relationships of these distances $P_1$ to $P_3$ become $P_1<P_2<P_3$.

The reason why plane S in the example shown in FIG. 3 is separated from the crest of tap main body 11 at a distance of L/3 to 2L/3 is that if plane S is at the crest or the heel of cutting edges 14a to 14c, the width of the groove parts 13a to 13c at the opposite side of the cutting edges create a wide difference, and therefore there is a risk that the chip discharge quality at groove parts 13a to 13c greatly decreases, especially when the width is small.

In contrast, if the plane S is at any position between both ends of cutting edges 14a to 14c, the magnitude relationships of the groove widths on the crest side with respect to plane S are reversed when compared to the magnitude relationships in the heel part.

However, the position of plane S does not necessarily have to be provided between either edge of cutting edges 14a to 14c. The positioning of plane S can be modified according to the dimensions of tap 10, for example, it can be positioned at the crest or heel part if there is a tap which is so short that $L/D=1$ (D=outer diameter). If plane S is not provided, it is acceptable that the circumferential pitch of each cutting edge 14a to 14c on the tap main body 11, which extends from the crest part of cutting edges 14a to 14c to the heel, be nonuniform.

According to tap 10 obtained by the above construction, since the angles which the cutting face of a land makes with the longitudinal axis of the tap $\theta_1$ to $\theta_3$ of the cutting edges 14a to 14c are set to have mutually differing values, the radial components of tap main body 11 of the cutting load imposed on cutting edges 14a to 14c are all different. Due to this, the balance of the cutting load in the radial direction of tap main body 11 is disrupted during the manufacturing process, and one part of male screw part 12 is more firmly pressed against the wall of the workpiece than other parts thereof. Therefore, in this condition, the thread and male screw part 12 are in contact when cutting edges 14a to 14c are screwed in and are advancing.

When the radial components of the cutting load imposed on the cutting edges 14a to 14c are balanced, it is logical that the force pressing male screw part 12 to the wall of the workpiece is not acting. However, since the cutting load actually acting on cutting edges 14a to 14c is in practice always acting, the balance of the radial components of the cutting load on tap main body 11 is constantly disturbed, and this creates an irregular vibration in male screw part 12. This irregular vibration influences the engagement between male screw part 12 and the thread of the workpiece and deteriorates the accuracy of the thread. However, by deliberately causing the unbalanced condition of the cutting load in the preferred embodiment, since a set part of male screw part 12 is normally pressed against the wall of the workpiece, a small variation of the cutting load of cutting edges 14a to 14c does not give rise to an irregular vibration in male screw part 12, and moreover, male screw part 12 and the thread formed in the workpiece are engageable in a set relationship.

Moreover, by firmly pressing a set part of male screw part 12 against the wall of the workpiece, the burnishing effect arising from abrasion increases. Consequently, the degree of surface roughness of the thread formed in the workpiece is improved, and as a result of this, the manufacturing accuracy of the female screw increases when compared with that of the prior art.

In particular, when tap 10 of the preferred embodiment in the machine tool is rotated at a high speed, since the circumferential distances of cutting edges 14a to 14c differ except in plane S, the distances cutting edges 14a to 14c cut into the workpiece change irregularly and the cutting load transferred from cutting edges 14a to 14c to tap main body 11 also change irregularly. Accordingly, the occurrence of cyclic vibration of tap main body 11 is prevented, and rather than counteracting the vibration transferred from cutting edges 14a to 14c, the increase in the vibration is controlled. Therefore, risks such as a deterioration in manufacturing accuracy and damage to the tap are avoided.

In the above-described preferred embodiment, all cutting edges 14a to 14c were explained with reference to an example of a spiral tap in which the cutting edges spiral along the entire length thereof; however, the present invention is not so limited.

Figure 4:
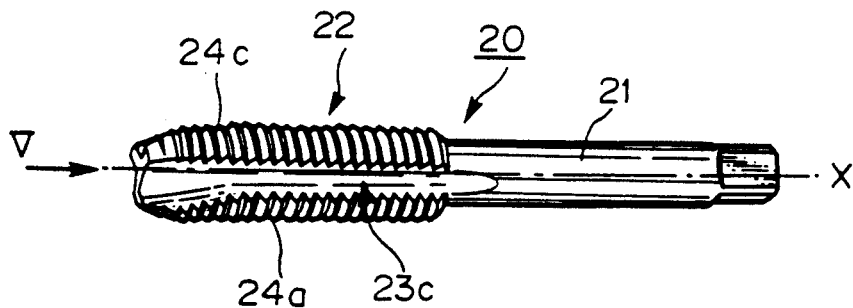
FIG. 4 shows a side view of a tap in a second embodiment of the present invention.
Figure 5:
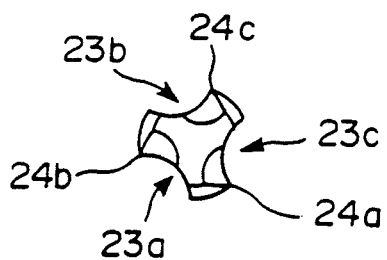
FIG. 5 shows the form of the tap in FIG. 4 when viewed in the direction of arrow V.
Figure 6:
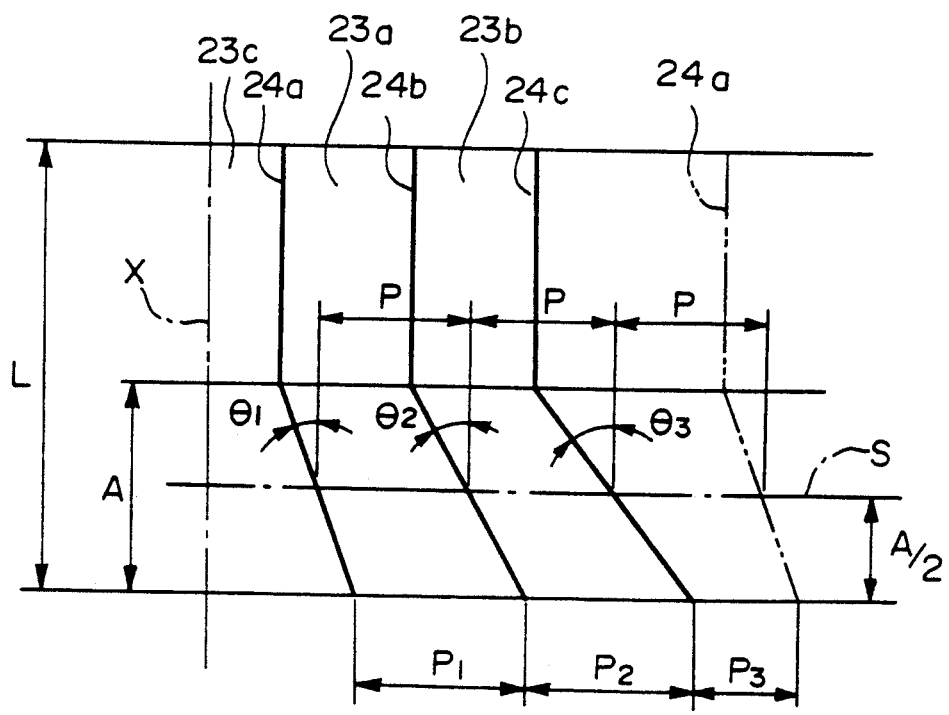
FIG. 6 shows an outer radial development of the male screw part of the tap in FIG. 4.
Figure 7:
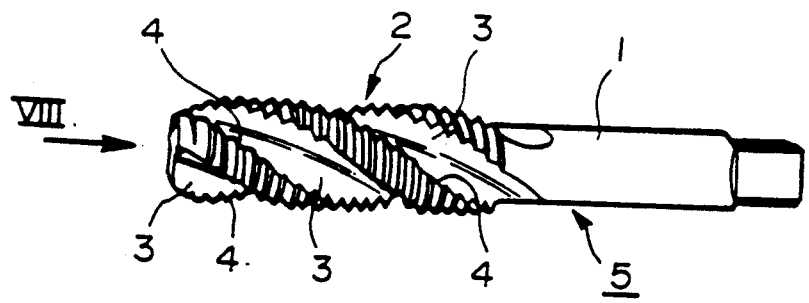
FIG. 7 shows a side view of a tap of the prior art.
Figure 8:
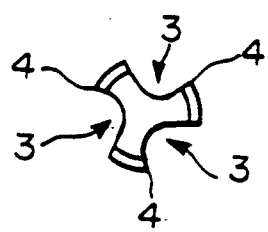
FIG. 8 shows the form of the tap in FIG. 7 when viewed in the direction of arrow VII.
Figure 9:
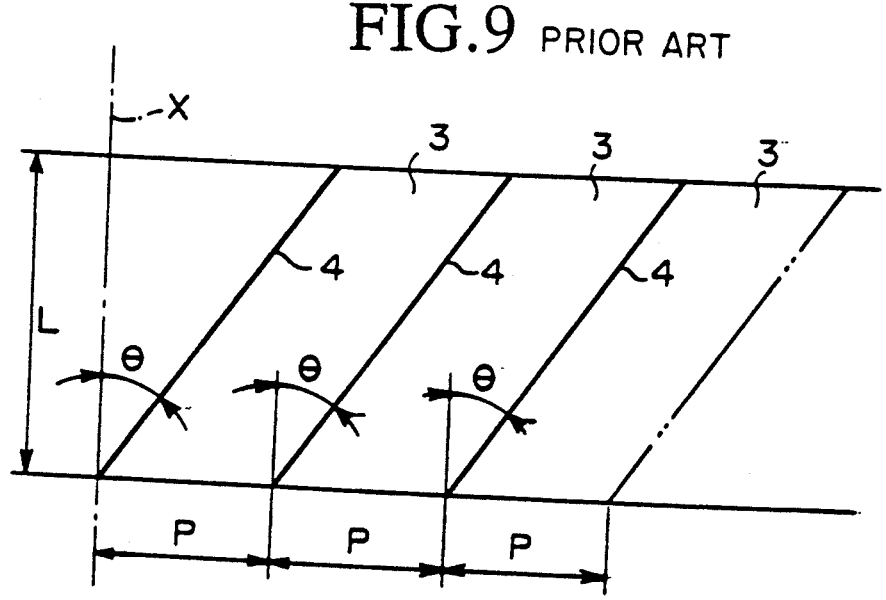
FIG. 9 shows an outer radial development of the male screw part of the tap in FIG. 7.
Figure 10:
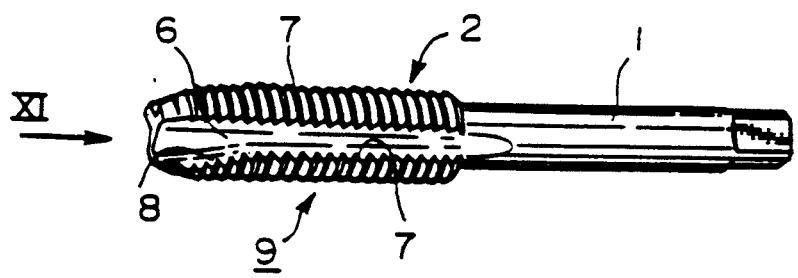
FIG. 10 shows a side view of an example tap of the prior art.
Figure 11:
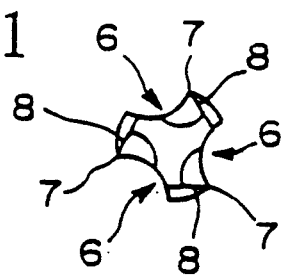
FIG. 11 shows the form of the tap in FIG. 10 when viewed in the direction of arrow XI.
Figure 12:
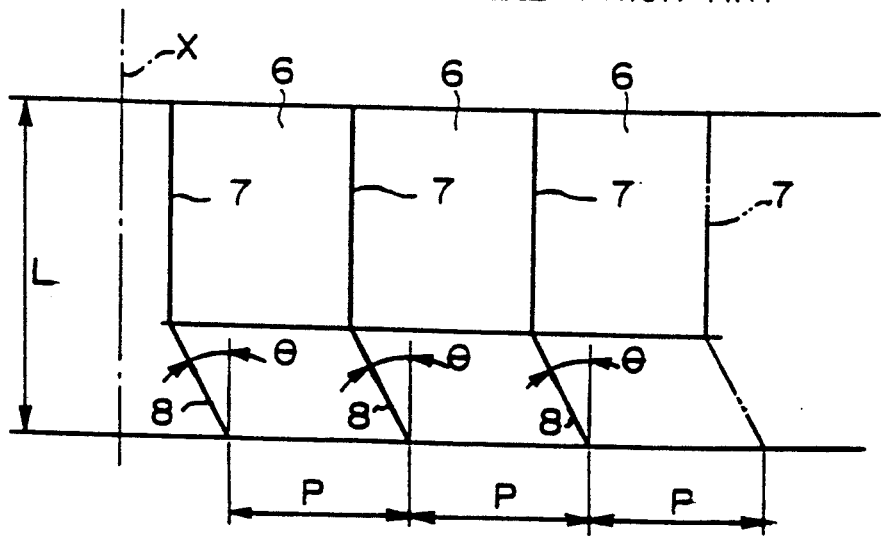
FIG. 12 shows an outer radial development of the male screw part of the tap in FIG. 10.

For example, in FIGS. 4 to 6, examples are shown in which the present invention is applied to gun taps. In tap 29, as shown in these figures, the inner walls of groove parts 23a to 23c formed in the male screw part 22 of tap main body 21 form a part in the area a fixed distance A from the crest of tap main body 21 in such a manner that the spiraling surface spirals in the opposite direction of spiral tap 10, and the crest part of cutting edges 24a to 24c formed on the male screw part 22 are formed as spiral cutting edges. The part containing the spiral cutting edge is formed as a straight cutting edge extending over to the axis X of tap main body 21.

The angles which the cutting face of a land makes with the longitudinal axis of the tap $\theta_1$ to $\theta_3$ of the spiral cutting edge of cutting edges 24a to 24c are set to be mutually different, and the magnitude relationships of these angles which the cutting face of a land makes with the longitudinal axis of the tap $\theta_1$ to $\theta_3$ are set so that $\theta_1 < \theta_2 < \theta_3$. The cutting edges 24a to 24c are arranged at a circumferential distance to tap main body 21 in a plane S orthogonal to the axis X of tap main body 21, and this is positioned at a distance A/2 from the crest of tap main body 21 so that the total length of the spiral edge of cutting edges 24a to 24c is defined as A. In this way, the circumferential distances $P_1$ to $P_3$ of cutting edges 24a to 24c on tap main body 21 fulfill the magnitude relationship $P_3 < P_1 < P_2$.

Also, in a tap such as tap 20, the variation of angles which the cutting face of a land makes with the longitudinal axis of the tap $\theta_1$ to $\theta_3$ of cutting edges 24a to 24c, as in the preferred embodiment illustrated in the above-explained FIGS. 1 to 3, the unbalanced condition of the cutting load in the radial direction of tap main body 21 is actively produced. Accordingly, the counteracting action which prevents irregular vibration of male screw part 22 functions, manufacturing accuracy increases; the suppression of vibration is accomplished by the inconsistency of vibration frequencies and therefore increased vibration is controlled.

In the tap 20, instead of forming the wall of the crest part of groove parts 23a to 23c in a spiral manner, it is possible to simply produce a linear notch slanting relative to the direction of the axis X of tap main body 21; a crest part of cutting edges 24a to 24c can also be formed as a slanting edge by slanting counter to the axis X of tap main body 21. In this case, by changing the angle of notching of the groove parts 23a to 23c, and by changing the angle which the cutting face of a land makes with the longitudinal axis of the tap of the crest part of cutting edges 24a to 24c, a result similar to the one of the aforementioned example can be obtained.

In the aforementioned preferred embodiment, a cutting edge having 3 parts is referred to, and it was also decided that the value of the angles which the cutting face of a land makes with the longitudinal axis of the tap of the crest part of the cutting edges are all different, whereas this is no limitation on the present invention since a tap consisting of 4 or more cutting edges may be similarly applied. Moreover, even when not all the angles which the cutting face of a land makes with the longitudinal axis of the tap of the cutting edges are set to differ from one another and only one of the angles which the cutting face of a land makes with the longitudinal axis of the tap of the crest part of the cutting edges is set to vary from the others, the above-described effects may also be expected. Moreover, it does not matter whether the screw of the cutting edges spirals to the left or to the right.

In FIGS. 1 to 6 illustrating the present preferred embodiment, in the cutting edges, the right-spiral or left-spiral is formed at the crest part of all the cutting edges; however, this is no limitation on the present invention since the twist may also be possible on, for example, one crest part of the cutting edges, whereas the other cutting edges may have an angle which the cutting face of a land makes with the longitudinal axis of the tap of 0° so that they are parallel to the axis X.

Next, effects of the present invention will be clear from the results of a chip discharge experiment.

The spiral taps shown in FIGS. 1 to 3 and the gun taps shown in FIGS. 4 to 6, having varying angles $\theta_1$ to $\theta_3$ in the screw diameter and the axial directions were produced, and using these taps, the torques produced during tap processing were measured. The results using the spiral taps are shown in Table 1, and the results using the gun tap are shown in Table 2.

In addition, in each table, experimental characteristics of the various prepared taps are summarized. In each table, the form code indicates the tap form: ST indicates the angles which the cutting face of a land makes with the longitudinal axis of the tap of the cutting edges are equal as in the tap of the prior art; EU and EE indicate the difference between the plane position where the distance of the circumferences of the spiral cutting edges are equal. In the case of a spiral tap, EU shows that the above plane is positioned along ½ of the length of the entire cutting edge; and EE shows that the above-mentioned plane is positioned at the crest of the cutting edge. In the case of a gun tap, EU shows that the plane is positioned at the heel of the spiral cutting edge, and EE shows that the plane is positioned at the crest of the spiral cutting edge.

TABLE 1

| MEASURE | FORM CODE | $\theta_1$ | $\theta_2$ | $\theta_3$ | TAPPING TORQUE VALUE kgf/cm (N/cm) |
|---|---|---|---|---|---|
| M10 × 1.5 | ST | 10° 30' | 10° 30' | 10° 30' | 72 (705.6) |
| | EE | 8° 30' | 10° 30' | 12° 30' | 65 (637) |
| | EU | 10° 30' | 12° | 13° 30' | 58.5 (573.3) |
| 3/8-24 UNF | ST | 16° 30' | 16° 30' | 16° 30' | 30 (294) |
| | EE | 12° | 14° 30' | 17° | 30 (294) |
| | EU | 19° | 21° 30' | 22° | 28 (274.4) |
| 3/8-24 UNF | ST | 15° | 15° | 15° | 32 (313.6) |
| | EE | 12° | 13° 30' | 15° | 32 (313.6) |
| | EU | 15° | 16° 30' | 18° | 31.5 (308.7) |

TABLE 2

| MEASURE | FORM CODE | $\theta_1$ | $\theta_2$ | $\theta_3$ | TAPPING TORQUE VALUE kgf/cm (N/cm) |
|---|---|---|---|---|---|
| M6 × 1 | ST | 51° | 51° | 51° | 34 (333.2) |
| | EE | 51° | 52° | 53° | 26 (254.8) |
| | EU | 50° | 51° | 52° | 25 (245) |

In typical processing using a tap, in order to discharge chips, counter-rotation of the tap is necessary; this is called "stepback processing", in the above experiment, the screwing distance is measured without stepback processing as long as the tap is turned in only one direction. As a result, in the ST type, stepback processing is necessary after approximately 10–15 mm of screwing distance; whereas in the EE type and EU type, stepback processing is not necessary for 17–20 mm. Therefore, the present invention is improved in that the allowable screwing distance before stepback processing is required is reduced by 5 to 7 mm.

According to the above experimental results, the required torque decrease for a large diameter tap and a tap having a large screw pitch appears to be larger than that of a small-diameter tap or a tap having a small screw pitch, and these effects vary according to the angle. The resistance encountered by the drill may also be reduced in accordance with the type of material being processed, such as titanium alloys and stainless steel, and other extremely hard materials which are difficult to drill.

Although only one spiral tap was tested, similar reduced resistances can also be obtained at various screw angles. The clogging of grooves with chips is evident from the data in the above table since a longer screw distance is possible in the present invention without stepback processing. If stepback processing is necessary, since the number of counter revolutions is reduced, the time required for tapping can be reduced and the costs of processing may also be reduced.

What is claimed is:

1. A tap comprising a tap main body; said tap main body having a male screw portion located on a distal end of said tap main body;
   said tap having a longitudinal axis extending through a center line of said tap;
   said male screw portion having a plurality of spiral grooves and spiral lands on an outer circumference of said male screw portion, each of said lands having a cutting face, a heel part, and a crest,
   each of said cutting faces being at an angle with respect to said longitudinal axis of said tap;
   wherein the angle of at least one of said cutting faces is different than the angle of at least one of said other cutting faces.

2. A tap according to claim 1 wherein the absolute difference between two said angles which a cutting face of a land makes with the longitudinal axis of the tap is in the range of 1° to 15°.

3. A tap according to claim 1 wherein all said cutting faces spiral from each of said crest parts to each of said heel parts following said outer circumference of said tap main body.

4. A tap according to claim 3 wherein each of said angles has a different value.

5. A tap according to claim 3 wherein said cutting faces are arranged such that said cutting edges are disposed at varying circumferential distances from one another along said tap main body in a plane orthogonal to the longitudinal axis of said tap main body.

6. A tap according to claim 5 wherein said plane is between either end of said cutting faces.

7. A tap according to claim 5 wherein said plane is at said crest part of said cutting faces.

8. A tap according to claim 5 wherein said plane is at said heel part of said cutting faces.

9. A tap according to claim 5 wherein said plane is at a position between ⅛ and ⅝ of the entire length of said cutting edge from the crest part of said cutting edge.

10. A tap comprising a tap main body; said tap main body having a male screw portion located on a distal end of tap main body;
   said tap having a longitudinal axis extending through a center line of said tap;
   said male screw portion having a plurality of grooves and lands on an outer circumference of said male screw portion, each of said lands having a cutting face, a heel part, and a crest,
   each said cutting faces being at an angle with respect to said longitudinal axis of said tap;
   said cutting faces being spiral cutting faces, said outer circumference of said tap at each of said crest part and said cutting edges being straight cutting edges at said heel part thereof; and wherein the angle of at least one of said cutting faces is different than the angle of at least one of said other cutting faces.

11. A tap according to claim 10 wherein at least one of said angles of said spiral cutting faces has a different value.

12. A tap according to claim 10 wherein said spiral cutting faces are arranged such that said spiral cutting faces are disposed at varying circumferential distances from one another along said tap main body in a plane orthogonal to the longitudinal axis of said tap main body.

13. A tap according to claim 12 wherein said plane is between the ends of said spiral cutting faces.

14. A tap according to claim 12 wherein said plane is at said crest part of the spiral cutting faces.

15. A tap according to claim 12 wherein said plane is in said heel part of the spiral cutting faces.

16. A tap according to claim 12 wherein said plane is positioned in one-half of the entire length of said spiral cutting faces from said crest part of said cutting face.

17. A tap comprising a tap main body; said tap main body having a male screw portion located on as distal end of tap main body;

said tap having a longitudinal axis extending through a center line of said tap;

said male screw portion having a plurality of grooves and lands positioned on an outer circumference of said male screw portion, each of said lands having a cutting face, a heel part, a crest part, each of said cutting faces being at an angle with respect to said longitudinal axis of said tap;

wherein all cutting faces being slanted cutting edges slanted with respect to the longitudinal axis of said tap at each of said crest part and said cutting faces being straight cutting edges of said heel part thereof; and wherein the angle of at least one of said cutting faces is different than the remaining angle of at least one of said other cutting faces.

18. A tap according to claim 17 wherein each of said angles of said slanted cutting face has a different value.

19. The tap of claim 10 wherein said plurality of cutting faces includes a first cutting face, a second cutting face, and a third cutting face; and said angle of said first cutting face is less than said angle of said second cutting face; and said angle of said second cutting face is less than said angle of said third cutting face.

20. The tap of claim 1 wherein said plurality of cutting faces includes a first cutting face, a second cutting face and a third cutting face; and said angle of said land of said first cutting face is less than said angle of said land of said second cutting face; and said angle of said land of said second cutting face is less than said angle of said land of said third cutting face.

* * * * *